United States Patent [19]

Gay et al.

[11] Patent Number: 5,082,098

[45] Date of Patent: Jan. 21, 1992

[54] ASSEMBLY FOR COUPLING A LOCATING MEMBER TO A DIAPHRAGM, PARTICULARLY FOR AN AUTOMOTIVE CLUTCH

[75] Inventors: Christian Gay, Paris; Philippe Lassiaz, Boulogne, both of France

[73] Assignee: Valeo, Paris, France

[21] Appl. No.: 367,737

[22] Filed: Jun. 19, 1989

[30] Foreign Application Priority Data

Jun. 23, 1988 [FR] France ................. 88 08439

[51] Int. Cl.⁵ ............................................. F16D 23/14
[52] U.S. Cl. ................................. 192/89 B; 192/98
[58] Field of Search .............. 192/98, 110 B, 89 B, 192/70.13

[56] References Cited

U.S. PATENT DOCUMENTS

| 4,648,499 | 3/1987 | Despres et al. | 192/98 |
| 4,667,800 | 5/1987 | Lassiaz et al. | 192/98 |
| 4,733,762 | 3/1988 | Gay et al. | 192/98 |
| 4,832,166 | 5/1989 | Parzefall | 192/98 |
| 4,863,005 | 9/1989 | Parzefall | 192/98 |

FOREIGN PATENT DOCUMENTS

| 0164871 | 12/1985 | European Pat. Off. . | |
| 2544035 | 10/1984 | France . | |
| 2557235 | 6/1985 | France | 192/98 |
| 2588338 | 4/1987 | France . | |
| 04374 | 6/1988 | PCT Int'l Appl. . | |
| 2193284 | 2/1988 | United Kingdom . | |

Primary Examiner—Rodney H. Bonck
Attorney, Agent, or Firm—Charles E. Brown; Charles A. Brown

[57] ABSTRACT

An automotive clutch has a diaphragm coupled to a clutch actuating member through a locating member and a coupling clip, the latter being arranged to join the clutch actuating member to the locating member by means of a snap fit. A "cage" is defined axially between the locating member and a retaining plate which is disposed on the side of the locating member opposite to the diaphragm. The assembly further includes a resilient member having a plurality of tongues extending axially through the diaphragm, and is hooked on the retaining plate by means of these tongues. The resilient member is arranged on the side of the diaphragm opposite to the locating member.

3 Claims, 1 Drawing Sheet

ASSEMBLY FOR COUPLING A LOCATING MEMBER TO A DIAPHRAGM, PARTICULARLY FOR AN AUTOMOTIVE CLUTCH

FIELD OF THE INVENTION

This invention relates generally to the coupling or attachment, to the diaphragm of a clutch, of a clutch actuating member arranged to exert a tractive force on the diaphragm, the said coupling being obtained partly by means of a locating member suitably coupled or attached to the diaphragm and partly by means of a coupling clip which is arranged to join the clutch actuating member with the locating member in a snap fit.

The invention is directed in particular to the fastening means for coupling the locating member with the diaphragm.

BACKGROUND OF THE INVENTION

U.S. Pat. No. 4,648,499 proposes in FIG. 8 to achieve this coupling by means of a cover having projecting elements extending generally axially through the diaphragm. The cover has a supplemental portion and, with the locating member (the coupling member), it defines a "cage" such as to retain the coupling clip while the locating member and clutch actuating member are being attached by a bayonet type coupling fit. The cover proposes in he above mentioned U.S. patent is comparatively complicated.

It has also been proposed to retain the coupling clip by means of a specific retaining plate, which is disposed on the side of the locating member opposite to the diaphragm and which defines the required "cage" in conjunction with the locating member.

It is however then necessary to ensure that the retaining plate is fixed to the locating member, and this provision is somewhat costly.

SUMMARY OF THE INVENTION

An object of the present invention is generally to provide a fixing means which allows this problem to be resolved in a manner that is particularly simple while being effective and inexpensive.

In an assembly according to the invention, this fixing means, which is accordingly adapted for the coupling of a locating member to a diaphragm, is of the kind comprising a resilient member which has a plurality of tongues extending generally axially through the diaphragm, with the assembly further comprising a cage for a coupling clip adapted to join a clutch actuating member to the locating member in a snap fit, the cage being defined axially between the locating member and a retaining plate disposed on the side of the latter opposite to the diaphragm, and the said retaining plate comprising a member separate from the resilient member, the latter being hooked on the retaining plate by means of the said tongues and being itself disposed on the side of the diaphragm opposite to the said locating member.

In this way, the resilient member has the additional advantage that it performs a double function, that is to say the coupling of the locating member to the diaphragm and the coupling of the retaining plate to the locating member.

The features and advantages of the invention will appear more clearly from the description which follows. The said description is given by way of example only and with reference to the accompanying diagrammatic drawings, which are as follows.

DESCRIPTION OF PREFERRED EMBODIMENTS

Figure 1:
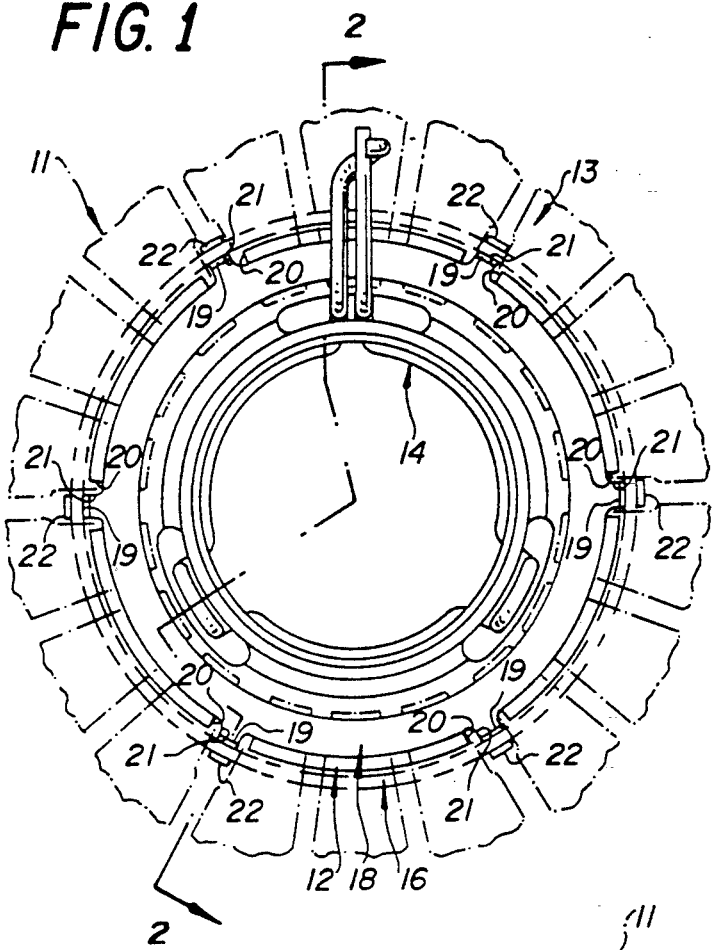
FIG. 1 is a view seen in elevation in the direction indicated by the arrows 1 in FIG. 2, and shows in heavy lines a fastening means according to the invention, with a part of the appropriate diaphragm shown in phantom lines and the clutch actuating member which is to be coupled to the diaphragm indicated in thinner full lines.

As is shown in FIG. 1, a clutch actuating member 10 is coupled to the diaphragm 11 of a clutch, partly by means of a locating member 12 and partly by means of a coupling clip 14. The locating member 12 is coupled or attached to the diaphragm 11 by fastening means 13 to be described below, while the coupling clip 14 is such as to enable the clutch actuating member 10 to be assembled on the locating member 12 with a snap fit.

The clutch actuating member 10, the diaphragm 11, the locating member 12 and the coupling clip 14 are not themselves part of the present invention, and will therefore not be described in detail here. It is enough to say that, for the axial retention of the coupling clip 14 during the snap fit fastening of the clutch actuating member 10, a cage 17 is provided. The cage 17 is formed axially between the locating member 12 and a retaining plate 16, which is disposed on the side of the locating member 12 opposite to the diaphragm 11.

In a known manner, the fastening means 13, coupling the locating member 12 to the diaphragm 11, comprises a resilient member having generally axially extending tongues 19 which extend axially through the openings formed for this purpose in the diaphragm 11. These openings are arranged alternatively with the successive fingers of the central portion of the diaphragm.

In accordance with the invention, the retaining plate 16 is a separate member from the resilient member 18. The latter, which is disposed on he side of the diaphragm 11 opposite to the locating member 12, is hooked on to the retaining plate 16 by means of the tongues 19.

Figure 2:
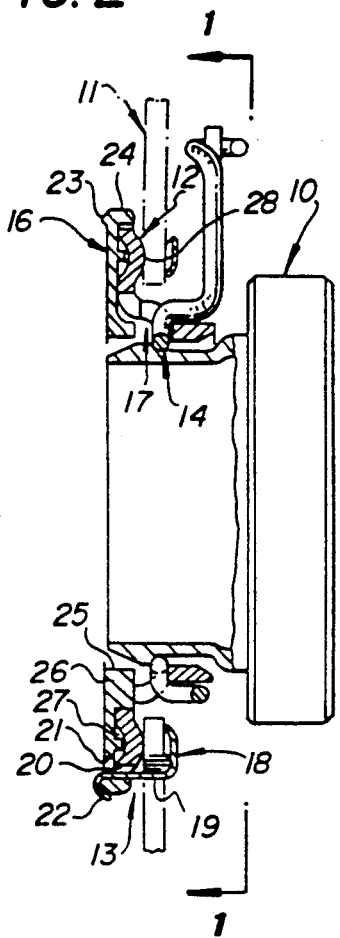
FIG. 2 is a view showing the fastening means in axial cross section, taken on the lines 2—2 in FIG. 1.

In the embodiment which is most particularly shown in FIGS. 1 and 2, the resilient member 18 is in the form of a corrugated ring, and its tongues 19 (of which there are six in this example) are spaced apart at regular intervals in the circumferential direction. The tongues 19 extend from the diaphragm 11 in the axial direction, firstly through the locating member 12, by means of slots 20 which are formed in corresponding positions in the outer periphery of the member 12, and form thence through the retaining plate 16 by means of similarly corresponding openings 21 formed in the latter.

In order that the tongues 19 can be hooked on to the retaining plate 16, each tongue has a radially directed, crook-shaped, bent portion 22 which engages with a shoulder 23 formed on the back of a circular peripheral flange 24 of the retaining plate 16. The flange 24 is directed axially towards the diaphragm 11, thus affording some stiffening to the retaining plate at the outer periphery of the latter.

The retaining plate 16 is made of a synthetic material in this embodiment, and has a flange 25 at its inner periphery. The flange 25 is again directed towards the diaphragm 11, and delimits the cage 17 while again providing stiffening to the retaining plate 16. The axial flange 25 has a plurality of occasional thickened portions 26 extending radially away from the axis of the assembly. Each of the thickened portions 26 is in engagement individually with a respective one of a plurality of openings 27 provided in the locating member 12.

In the embodiment shown, the retaining plate 16 also has an annular rib located intermediate between its axial flanges 24 and 25, with this rib being directed axially in the same direction as these flanges. The rib 28 further improves the stiffening of the retaining member 16.

To assemble the fastening means of the invention, all that is needed is to present the resilient member 18 on one side of the diaphragm 11, and then similarly to present on the other side of the diaphragm 11 the locating member 12 and retaining plate 16. The latter is then preferably rotated so as to be located on the locating member 12 by means of the radially thickened portions 26 of its inner axial flange 25. The assembly is then snapped on to the tongues 19 of the resilient member 18 by simple elastic deformation of the tongues.

As will be noted, the assembly comprising the diaphragm 11 and the locating member 12 is resiliently gripped between the retaining plate 16 and the resilient member 18, and this ensures both that the locating member 12 is coupled with the diaphragm 11 and maintained in resilient contact with the latter, and also that the retaining plate 16 is coupled with the locating member 12.

Figure 3:
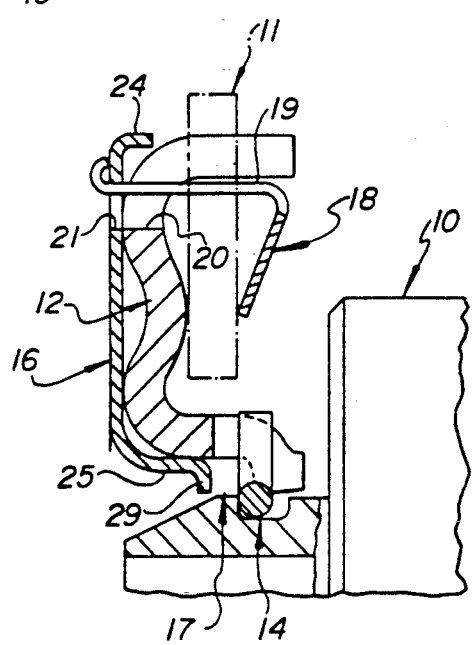
FIG. 3, which is on a larger scale, in a view in axial cross section, similar to part of FIG. 2 but showing another embodiment.

In the embodiment shown in FIG. 3, the resilient member 18 is in the form of a Belleville washer. Also in this embodiment, the retaining plate 16 is of pressed plate construction with openings 21 through which the tongues 19 of the resilient member 18 extend. The retaining plate 16 has on its outer periphery an axial flange 24 and on its inner periphery an axial flange 25, which in this example terminates in a radial flange 29 extending towards the axis of the assembly.

In practice, the method of assembling this embodiment, instead of involving resilient deformation of the tongues 19 of the resilient member 18, calls simply for a change in the geometry of the latter. The corresponding method is not itself part of the present invention and need not be set out in detail here.

The invention is not of course limited to the embodiments described and shown, but encompasses all possible embodiments.

What is claimed is:

1. An assembly comprising a diaphragm, a locating member, and fastening means for coupling the locating member to the diaphragm, wherein the fastening means comprises a resilient member defining a plurality of generally axially extending tongues, the diaphragm having tongue receiving means and the tongues extending through said tongue receiving means, the assembly further comprising a clutch actuating member, a coupling clip fastening the clutch actuating member and the locating member together by a snap fit, and a retaining plate disposed on the side of the located member opposite to the diaphragm, the locating member and retaining plate together defining between them an axially extending cage, the retaining plate being a separate member from said resilient member, said resilient member being disposed on the side of the diaphragm opposite the locating member and being hooked in the retaining plate by means of said tongues.

2. An assembly according to claim 1, wherein said resilient member comprises a corrugated ring.

3. An assembly according to claim 1, wherein said resilient member comprises a Belleville washer.

* * * * *